(12) United States Patent
Achenbach (10) Patent No.: US 8,944,422 B2
(45) Date of Patent: Feb. 3, 2015

(54) SPRING SYSTEM FOR BICYCLES

(75) Inventor: Martin Achenbach, Biel (CH)

(73) Assignee: DT Swiss, Inc., Grand Junction, CO (US)

( * ) Notice: Subject to any disclaimer, the term of this patent is extended or adjusted under 35 U.S.C. 154(b) by 58 days.

(21) Appl. No.: 12/870,154

(22) Filed: Aug. 27, 2010

(65) Prior Publication Data

US 2010/0320656 A1 Dec. 23, 2010

Related U.S. Application Data

(62) Division of application No. 11/318,895, filed on Dec. 27, 2005, now Pat. No. 7,806,390.

(30) Foreign Application Priority Data

Nov. 29, 2005 (DE) .......................... 10 2005 057 186

(51) Int. Cl.
| | | |
|---|---|---|
| *B60G 17/00* | (2006.01) | |
| *F16F 9/02* | (2006.01) | |
| *B62K 25/04* | (2006.01) | |
| *F16F 9/44* | (2006.01) | |

(52) U.S. Cl.
CPC .............. *F16F 9/0209* (2013.01); *B62K 25/04* (2013.01); *F16F 9/0281* (2013.01); *F16F 9/44* (2013.01); *B62K 2025/048* (2013.01)
USPC .................................... 267/64.17; 267/64.25

(58) Field of Classification Search
USPC ............. 267/64.17, 24.22, 279.1, 276, 64.25, 267/64.28; 188/317, 314, 315
See application file for complete search history.

(56) References Cited

U.S. PATENT DOCUMENTS

| | | | | | |
|---|---|---|---|---|---|
| 2,756,071 | A | * | 7/1956 | Danilo Riva ................... | 280/283 |
| 3,152,665 | A | * | 10/1964 | Sidney et al. .............. | 188/299.1 |
| 3,610,604 | A | * | 10/1971 | Terai ................................ | 267/39 |
| 3,794,309 | A | * | 2/1974 | Chrokey et al. ................. | 267/34 |
| 3,804,446 | A | * | 4/1974 | Warrener ....................... | 293/134 |
| 3,976,287 | A | * | 8/1976 | Kendall et al. ................ | 267/139 |
| 4,078,638 | A | * | 3/1978 | Koyama et al. ............... | 188/288 |
| 4,712,775 | A | * | 12/1987 | Buma et al. .................... | 267/220 |
| 4,718,647 | A | * | 1/1988 | Ludwig ....................... | 267/64.11 |
| 4,796,871 | A | * | 1/1989 | Bauer et al. ................ | 267/64.11 |
| 4,838,392 | A | * | 6/1989 | Miller et al. .................. | 188/277 |
| 4,846,317 | A | * | 7/1989 | Hudgens .................... | 188/266.5 |
| 4,899,853 | A | * | 2/1990 | Hummel ....................... | 188/269 |
| 5,158,270 | A | * | 10/1992 | Lin ................................ | 267/226 |
| 5,788,030 | A | * | 8/1998 | Rottenberger ................ | 188/290 |
| 5,957,252 | A | * | 9/1999 | Berthold ....................... | 188/314 |
| 6,135,434 | A | * | 10/2000 | Marking .................... | 267/64.26 |

(Continued)

FOREIGN PATENT DOCUMENTS

DE          10 252 557          11/2002

*Primary Examiner* — Robert A Siconolfi
*Assistant Examiner* — James Hsiao
(74) *Attorney, Agent, or Firm* — Greer, Burns & Crain, Ltd.

(57) ABSTRACT

A spring system in particular for bicycles includes a gas suspension spring with adjustable progression and a housing element for movably receiving the suspension piston of the gas suspension spring. The gas suspension spring has a spring volume including a first spring chamber and at least a second spring chamber separated from one another by a partitioning member. The first spring chamber is arranged within the housing element and the second spring chamber extends internal of the housing portion consecutive to the housing element.

12 Claims, 5 Drawing Sheets

(56) References Cited

U.S. PATENT DOCUMENTS

| | | | |
|---|---|---|---|
| 6,254,067 B1 * | 7/2001 | Yih | 267/64.22 |
| 6,286,642 B1 * | 9/2001 | Yi | 188/319.2 |
| 6,386,525 B1 * | 5/2002 | Stuart | 267/64.27 |
| 6,910,682 B2 * | 6/2005 | Fritz | 267/64.25 |
| 6,938,887 B2 * | 9/2005 | Achenbach | 267/64.22 |
| 6,953,108 B2 * | 10/2005 | Anderfaas et al. | 188/267.2 |
| 6,959,548 B2 * | 11/2005 | Borg et al. | 60/632 |
| 7,124,865 B2 * | 10/2006 | Turner et al. | 188/322.2 |
| 7,140,601 B2 * | 11/2006 | Nesbitt et al. | 267/64.13 |
| 7,219,881 B2 * | 5/2007 | Denk | 267/64.15 |
| 7,261,194 B2 * | 8/2007 | Fox | 188/275 |
| 7,273,137 B2 * | 9/2007 | Fox | 188/275 |
| 7,308,976 B2 * | 12/2007 | Turner | 188/282.8 |
| 2002/0175035 A1 * | 11/2002 | Achenbach | 188/315 |
| 2003/0127781 A1 * | 7/2003 | Fritz | 267/64.24 |
| 2003/0234144 A1 * | 12/2003 | Fox | 188/278 |
| 2004/0134730 A1 * | 7/2004 | Forster | 188/314 |
| 2005/0012255 A1 | 1/2005 | Denk | |
| 2005/0252330 A1 * | 11/2005 | Denk | 74/502.2 |
| 2006/0027954 A1 * | 2/2006 | Nesbitt et al. | 267/64.11 |
| 2007/0158927 A1 * | 7/2007 | Fox | 280/276 |
| 2009/0001684 A1 * | 1/2009 | McAndrews et al. | 280/276 |
| 2009/0236807 A1 * | 9/2009 | Wootten et al. | 280/5.514 |

* cited by examiner

SPRING SYSTEM FOR BICYCLES

PRIORITY CLAIM

This application is a divisional application of U.S. application Ser. No. 11/318,895, filed Dec. 27, 2005, now U.S. Pat. No. 7,806,390, under 35 U.S.C. §121.

BACKGROUND

The invention relates to a spring system, in particular for bicycles.

In the field of bicycles, spring systems have become known where a spring suspension can substantially be blocked through a lockout setting.

With US 2003/0234144 A1, a spring system for bicycles has become known where the spring characteristics of the spring system can additionally be set in two steps in that two air chambers are arranged in one cylinder which are separated from one another by a partitioning member arranged internal of said cylinder. The partition has a switchable valve provided in it to permit or prevent communication with the second air chamber. Closing of the valve and separating the second chamber causes the spring characteristics to become highly progressive since the compressible volume is reduced.

US 2005/0012255 A1 discloses a spring system comprising two air chambers with the second air chamber arranged external of the cylindrical housing. Said additional air chamber is configured as a separate cylinder arranged parallel to said first cylinder.

It is the object of the present invention to provide another spring system which allows a highly variable configuration of the spring characteristic curves.

SUMMARY OF THE INVENTION

The spring system according to the invention is in particular suitable for bicycles, comprising at least one gas suspension spring with adjustable progression. At least one housing element is provided for movably receiving the suspension piston of the gas suspension spring. The gas suspension spring comprises a spring volume including a first spring chamber and at least a second spring chamber separated from one another by a partitioning member. The first spring chamber is arranged internal of the housing element. The second spring chamber advantageously extends inside the separate housing portion consecutive to the housing element.

The invention has considerable advantages. Although the invention allows a simple and variable structure, the progression of the gas suspension spring is adjustable and the spring volume comprises at least two spring chambers. The arrangement of the second spring chamber external of the housing element that receives the suspension piston, allows highly variable dimensions for example of the diameter of the second spring chamber which can thus be independent of the spring volume of the first spring chamber.

The length of such spring systems for bicycles is specified as a rule since the dimensions are standardized. This is the reason why one cannot simply extend the overall length of the spring system so as to use the largest possible volume for the second spring chamber (second volume) to generate the highest possible difference in progression of the two spring characteristics. In the prior art according to US 2003/0234144 A1, the size of the second volume is clearly limited in that for technical reasons the outer diameter of the volume of the first spring chamber (first volume) is maintained.

In contrast, the present invention allows variation of the volume of the second spring chamber independently of the volume of the first spring chamber since—other than the length—the outer dimensions of the second spring chamber can be selected independently of the outer dimensions of the first spring chamber. This is caused by said second spring chamber being arranged external of the housing element that receives the suspension piston. Simultaneously the constructional efforts required are few since the second spring chamber extends internal of the separate housing portion consecutive to the housing element.

Preferably the bearing race of the suspension piston is provided in the housing element and it is in particular formed therein.

Overall, the gas suspension spring is configured as a positive spring. In addition to the gas suspension spring having said at least two spring chambers, at least one negative spring may also be integrated into the spring system which may for example be configured as a gas spring or an elastomeric spring, causing some pre-stress so as to adapt the entire spring characteristics.

It is also possible to provide more than two spring chambers. For example three or four or five spring chambers may be provided.

All of the embodiments of the spring system comprise in particular a first load-applying segment and a second load-applying segment so as to allow application of the forces to the spring system. Preferably the first load-applying segment is provided at a first end and the second load-applying segment, at a second end. In another preferred embodiment the outer cylinder may also be utilized as a load-applying segment by means of a connection element with the frame.

The housing element is in particular configured to be an outer cylinder of the suspension piston. The housing element preferably comprises a cylindrical interior wall and may also include a cylindrical outer wall.

The second spring chamber is preferably arranged external of the outer cylinder. The partition is preferably also arranged external of the outer cylinder.

Preferred embodiments provide for the second spring chamber to be positioned axially directly or at least substantially directly behind the first spring chamber.

An advantageous structure of the second spring chamber is substantially rotationally symmetric. The design of the second spring chamber is in particular substantially annular. A portion of the control device, which may comprise a rotatable or axially displaceable axial rod, preferably passes through the interior of said ring.

Preferred embodiments provide a substantially cylindrical or annular design of the first spring chamber. However, it is also conceivable to provide the housing portion with bulges shaped other than rotationally symmetric so as to expand the volume of the second spring chamber.

In a specific embodiment having for example three spring chambers, the first spring chamber may be conventionally configured to be annular or cylindrical while the second and the third spring chambers combined also form a volume for example in the shape of a cylinder or a ring. Subdividing the second and the third (and the fourth etc.) spring chambers may for example occur through perpendicular partition walls oriented parallel to the axis of symmetry such that the second and the third spring chambers form a half ring each.

The invention allows adaption of the volumes of the first and the second spring chamber independently from one another. Preferably an outer diameter of the second spring chamber is chosen to be larger than an outer diameter of the first spring chamber. In preferred embodiments the maximum outer diameter of the second spring chamber is larger by at least 5%, in particular at least 10%, than the maximum outer diameter of the first spring chamber. This allows a volume expansion of the second spring chamber while maintaining the length. The volume of the second spring chamber will then be set through a suitable outer diameter.

A specific configuration provides a maximum outer diameter of the first spring chamber of 42 mm. The maximum outer diameter of the axially adjacent second spring chamber may then be smaller or also larger. Preferably the maximum outer diameter is larger. One embodiment provides a maximum outer diameter of at least 45 mm, in particular 47 mm. Diameters of 50 mm or 55 mm are also possible. This is achieved by the configuration according to the invention without using intricate structures that would require attaching additional lateral chambers to and connecting with the main chamber.

The housing element of the spring system may be connected with a housing segment or a cover lid. Also, the housing segment itself may be configured as a cover lid. The housing segment has in particular the second spring chamber extending in it. This is the reason why as a rule the outer diameter of the housing segment is larger than that of the housing element comprising the suspension piston. The housing segment may be provided with an adjustment means for setting the progression of the spring characteristics.

All of the embodiments may provide for at least one housing portion to be composed of a fibrous composite material, at least in part. The weight can thus be reduced, given comparable fitted dimensions and otherwise comparable specifics, by approximately 5% to 10%, resulting in saving approximately 10 to 20 grams in weight. This is a significant progress since each gram counts for both professionals and ambitious amateurs.

It is possible to use a thermosetting matrix material. It is in particular preferred, however, that the housing element which receives the suspension piston is at least partially composed of a fibrous composite material with a thermoplastic matrix material. Thermoplastic materials can be welded and machined.

In preferred specific embodiments, the housing element which receives the suspension piston comprises a thread for example for screwing on another housing segment or a cover lid.

It is in particular preferred to configure the thread integrally with the housing from a fibrous composite material or to form it integrally in the housing element. This is in particular advantageous since the further step of adhering a threaded ring is omitted. Weight is also saved. Preferably the thread is provided directly on the core used in manufacturing, being directly wound on during production. This procedure has unexpectedly proven to be a success, moreover since a considerable pressure difference must be sealed off toward the ambience via the thread.

In other embodiments having a housing element of a fibrous composite material it is also possible to attach a thread element or adhere a thread insert.

All of the embodiments preferably provide at least one damping means.

According to another aspect of the invention it is an object of the invention to provide a spring system having adjustable progression and a damping means the damping action of which is adjustable and which allows a simple and reliable adjustment of progression and of the damping action of the damping means.

The systems known in the prior art all provide at least one adjustment means for adjusting the damping action and another, separate adjustment means is provided for setting the progression of the spring characteristics.

A system has become known where the two different control levers are operated with one single control cable, however the coordinating and synchronizing efforts required are high. In particular after being in operation for a long time, local elongation or lengthening may occur in the control cable or other components or settling may result in different conditions such that an originally set and adjusted synchronization may be neutralized. This leads to annoying readjustments and may result in malfunction.

Furthermore, the position of the control levers being exposed to water and abrasive matter may cause diminished functionality due to soiling.

The spring system according to the invention comprises at least one housing and at least one gas suspension spring with adjustable progression and at least one damping means, the damping action of which is adjustable. Furthermore one single adjustment element is provided at the housing for adjusting, through movement from a first position to a second position, at least the progression of the gas suspension spring and through movement from the second to a third position, at least the damping action of the damping means.

This invention also has numerous advantages. A transfer of the single adjustment element arranged at the housing, from a first position to a second position changes the adjustable progression. The progression is in particular increased. The damping action of the adjustable damping means, however, preferably remains unchanged in said second position. A transfer of the single adjustment element from the second position to a third position changes the damping action of the adjustable damping means. The progression of the gas suspension spring may correspond to the progression in the second position but it may also correspond to the progression in the first position.

Preferred specific embodiments may provide a fourth position where both the progression and the damping action are influenced.

In all of the embodiments described above the gas suspension spring preferably comprises an adjustable spring volume. The gas suspension spring comprises in particular at least two spring chambers which communicate in particular through a closable aperture. The connection or the aperture may be provided for example in a flow channel or it may be formed by a valve.

The adjustment element may be arranged at the housing but in particular extends into the housing.

The adjustment element may be configured as a rotatable and/or displaceable element. What is preferred is one single element that is free to rotate and interacts with one or more linearly movable elements. The linearly movable elements may be configured to be push rods. The rotational movement of the rotationally movable element may also be transferred into a linear movement via a conrod or a number of conrods or a toothed rack.

A rotationally movable arrangement of the adjustment element allows a simple and reliable configuration without requiring extensive maintenance. Said adjustment element is in particular configured to be a camshaft.

The camshaft may, through a slider, act on a valve aperture so as to cause the aperture between the first and the second spring chamber to open and to close. To this end, said camshaft comprises one or more control surfaces cooperating with a slider or several sliders. The camshaft may also act on a pushing element or on a valve configured as a slider.

If more than two spring chambers are provided, the camshaft may act differently upon different pushing elements or sliders or upon one slider so as to open and close the individual apertures separately from one another.

The damping action of the damping means is also preferably adjusted by rotating the camshaft which acts upon a control surface for adjusting the damping action.

There is in particular provided one common, single adjustment means or one common, single adjustment element both for manipulating a damping property and for changing the progression of the suspension spring. In addition to this one common, single adjustment element, another setting element may be provided for example to generally match the spring system for example to the rider's weight. As a rule, coarse settings will thus occur only once or infrequently while fine adjustments are made as needed during operation by means of the one common, single adjustment means.

Other embodiments may be configured to receive the adjustment element to be displaceable. The individual positions can be set by different degrees of displacement. A combined rotating and displacing movement is also possible and preferred.

In all of these cases the second position is preferably arranged between the first and the third positions. It is preferred that in the second position, the aperture between the first and the second spring chamber is closed such that the volume of the second spring chamber is blocked and no longer involved in damping the gas suspension spring. This will cause a marked increase in the progression of the active gas suspension spring.

A specific embodiment of the invention provides a third setting or position where the aperture is closed and the damping action adjusted.

In another preferred embodiment, a separate additional cylinder is provided having a second spring chamber which can be added to be engaged jointly with the first volume of the first spring chamber. In this preferred specific embodiment the changed damping and adjustment of the spring characteristics occurs through one single, common adjustment element provided at the housing and extending into the housing.

The invention may be realized as a suspension fork in particular for bicycles wherein said suspension fork comprises a fork and at least one spring system attached thereto as described above. Different combinations of individual embodiments are also possible.

BRIEF DESCRIPTION OF THE DRAWINGS

Further advantages and embodiments of the present invention follow from the embodiment which will now be described with reference to the attached drawings.

DETAILED DESCRIPTION

A first embodiment of the spring system 1 according to the invention will now be described with reference to the FIGS. 1 to 3. The spring system comprises several springs 10, 12, 14, 16 and a damping means 18. The spring system comprises, as is known per se, the damping means 18 which cooperates with a gas spring 14 configured as a positive spring.

The damper housing 17 has a gas spring 10 provided therein which is separated from the first damping chamber 13 of the damper by means of a dividing piston 11. The damping means 18 further comprises a damping piston 36 which separates the two damping chambers 13 and 15 from one another. Apertures 44 and 46 in the damping piston 36 allow a flow connection between the two damping chambers 13 and 15. The apertures 44 and 46 can be closed in whole or in part via the axial rod 35.

Furthermore the piston 36 may comprise a passage (not shown) which is not covered by the check valve 45 that is configured as a disk.

The invention is not limited to the embodiment shown. According to the invention, differently configured spring systems may be used as well.

Figure 1:
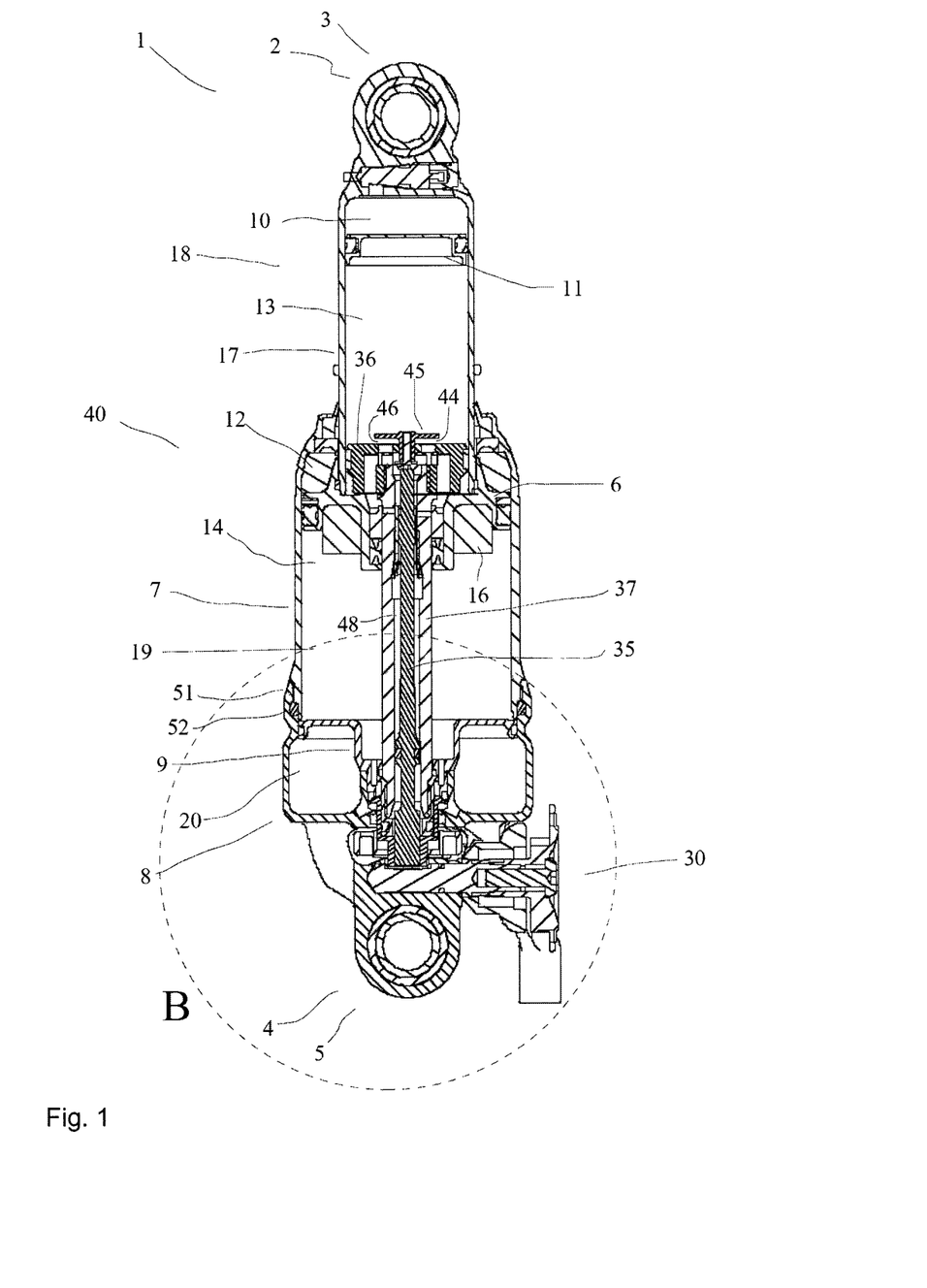
FIG. 1 is a sectional view of a spring system according to the invention.

The configuration of FIG. 1 provides a damper housing 17 that is substantially configured as a cylinder. At the first end 2 of the spring system 1, the damper housing 17 is fixedly connected with a first, eyelet-type load-applying segment 3. At the second end 4 of the spring system 1, a second, eyelet-type load-applying segment 5 is provided.

The spring system 1 comprises a housing 40 which comprises at least the damper housing 17, the housing element 7 and the housing segment 8.

The housing element 7, which is substantially configured as a cylinder, has the suspension piston 6 provided therein. The housing element 7 forms an outer cylinder to receive the suspension piston 6 entirely and the gas spring 14, which is configured as a suspension spring, in part. In compressing the damper housing 17 which is connected with the suspension piston 6 plunges into the outer cylinder or the housing element 7, respectively.

The gas spring 14 comprises a spring volume which in this case may be composed of the subvolumes of the first spring chamber 19 and the second spring chamber 20. The two spring chambers 19 and 20 are divided by a partition 9 which in this embodiment is arranged external of the volume spanned by the cylindrical housing element 7. A valve means at the partition 9 allows the two spring chambers to communicate with one another and then be separated again.

The valve means for connecting the two subvolumes of the spring chambers 19 and 20 comprises apertures 21 and 22, and a channel 24. The connection between the two subvolumes of the spring chambers 19 and 20 can be opened and closed by means of a slider 23. The slider 23 in this embodiment is configured to be coaxial and concentric relative to the center axis of symmetry and arranged to be concentric around the central axial rod 35. While the slider 23 serves to adjust the progression, the damping action is adjusted by means of the axial rod 35.

The positions of the slider 23 and the axial rod 35 are controlled via an adjustment element of the control means 30 configured as a camshaft 31 which also comprises the slider 23 and the axial rod 35. The camshaft 31 is oriented transverse to the longitudinal direction of the spring system 1 and may comprise an adjusting wheel at its outward end. The camshaft may be connected with a cable such that adjustments can be made from the bicycle handlebar. The camshaft 31 is one single, common adjustment element of the spring system 1 by means of which the progression of the spring characteristics and a damping property can be adjusted.

The cams 33 and 34 of the camshaft 31 cooperate with corresponding effective areas at the slider 23 so as to axially displace said slider 23. Since the slider extends outwardly where the ambience pressure is lower, in this embodiment the pressure acting in the gas suspension spring 14 generally urges the slider 23 outwardly such that said slider 23 unblocks the channel 24 to connect the two spring chambers 19 and 20. The volumes of the first spring chamber 19 and the second spring chamber 20 of the gas suspension spring 14 can then communicate.

With the spring chambers 19 and 20 communicating, the achieved progression of the gas spring is lower since the larger entire volume is available. When, however, the camshaft 31 is rotated still further or else it is reversed, the cams 32 and 34 cause the slider 23 to be axially displaced in the direction of the first end 2. The slider 23 blocks the apertures 21 and 22 such that the two spring chambers 19 and 20 are separated from one another. The progression of the suspension spring 14 increases substantially. In this case for example only 70% of the maximum suspension travel is usable since the force increases greatly due to the reduced suspension volume. The spring volume remaining available for the suspension spring 14 is then only the volume of the first spring chamber 19.

Other preferred embodiments provide for a reversed action of the slider 23. Therein the slider is in an unloaded position from where the internal system pressure urges it outwardly toward the second end 4 to assume a closed position. An activation by the cams 32 and 34 causes axial displacement toward the first end 2, and the flow connection of the two spring chambers is established. Likewise the axial rod 35 can be urged outwardly from the normal state into a closed position. In these embodiments the axial rod 35 is then actively moved through the cam 33 toward the first end 2 so as to unblock the apertures 44 and 46.

The control means 30 and in particular the adjustment element 31 in this embodiment is arranged at the housing 40, partially extending therein. In particular the adjustment element 31 is provided at and partially internal of the housing element 8 which also forms the cover lid of the spring system 1. The control means 30 comprises the adjustment element 31 configured as a camshaft which is arranged to be rotatable in the housing segment 8.

The invention allows variable dimensioning of the spring progression since the volumes of the two spring chambers 19 and 20 can be configured independently of each other. The radial extension of said second spring chamber 20 can be considerably increased so as to realize the large spring volume of the second spring chamber as is frequently desirable. Since the fitted length is predetermined as a rule, the invention allows for a highly variable adaptation to requirements. With the fitted length maintained, the two progressions of the gas suspension spring can be spread over a markedly increased range.

Attaching more cylindrical spring chambers to the exterior of the first spring chamber can be omitted in many cases.

The housing segment 8 is arranged directly consecutive to the external cylinder or the housing element 7. The housing segment 8 which is configured as a separate component is screwed onto a thread at the housing element 7 by means of a screw thread 51. A sealing ring 52 of a suitable sealant can further be provided. The partition 9 simultaneously serves to seal the first spring chamber 19 and to seal the second spring chamber 20 such that the spring chambers 19 and 20 are partially directly adjacent to one another. The second spring chamber 20 extends radially farther outwardly than the first spring chamber 19. The outer diameter of the second spring chamber 20 may be up to 55 mm or more with the outer diameter of the first spring chamber 19 being for example 42 mm. This means an outer diameter larger by approximately 30% which quite considerably affects the feasible volume of the second spring chamber 20.

The contour of the partition 9 is stepped, being matched to the contour of the oil chamber seal or the suspension piston 6, respectively, to result in the smallest possible residual volume of the chamber 19 in a fully compressed state. To avoid bottoming out, the suspension piston 6 has an elastomeric spring 16 provided on its side facing the partition 9 to prevent the suspension piston 6 from hitting on the partition when the second spring chamber 20 is activated.

The housing element 7 or also the housing segment 8 may be made of a fibrous composite material in this embodiment. For this purpose, for example in the case of the housing element 7, a fibrous composite material is deposited on a cylindrical core having precisely specified dimensions. Prefabricated pads, woven fabrics or prepregs or the like are preferably used to speed up the manufacturing process. It is also possible to use other methods for depositing the fibrous composite material.

After winding the material around the core, the inner mold is closed by means of a multipart outer mold so as to seal the inner mold radially inwardly. The outer tool may comprise for example three segments covering angles of for example 120° each. Gaps of for example ¹⁄₁₀ to approximately ⁵⁄₁₀ mm may remain between the individual segments to ensure that excess matrix material can escape and to make sure that no voids remain in the workpiece. Instead of small gaps, tiny or minuscule holes in the segments are conceivable for air and material to escape.

Two or four or more segments are likewise possible. While the inner mold is being heated, the multipart outer mold exerts pressure on the inner mold to allow the material to distribute homogeneously and free of voids. If thermoplastic matrix material is used, it is sufficient to heat the mold for a short time to a temperature above the melting temperature. With thermosetting material the heating phase is longer to ensure optimum curing.

The core material is chosen such that in cooling the core will contract more than does the fibrous composite material such that the core can be removed after cooling. Inflatable cores cannot be used since reproducible manufacture of a surface to be cylindrically smooth and homogeneous is not possible. The outer dimensions of the core are matched to the manufacturing process and the material so as to obtain a precisely dimensioned component after cooling.

After cooling and after finishing if required the housing element 7 or the housing segment 8 can be integrated into the spring system.

The bottom surface of the piston 36 may be provided with valves such as check valves etc. to achieve different damping actions in the opposite damping directions. The valves may be configured for example as small elastic plates arranged at the damping piston 36 such that a pressure load causes the damping medium to flow from the first into the second chamber while a tensile load prevents any flow of damping medium. The damping medium used is in particular oil.

The piston rod 37 has an axially extending hollow space 48 arranged at it. The piston rod case wall has damping through passages provided in it to connect the hollow space 48 with the second damper chamber 15.

The axial rod 35 cooperates with the camshaft 31 which may be connected with an adjusting wheel 30.

The hollow space 48 is opened toward the first damping chamber 13 via the apertures 44 and 46 such that with a suitable axial position of the axial rod 35, oil can flow between the first chamber 13 and the second chamber 15 through the damping through passages, and vice versa.

Figure 2:
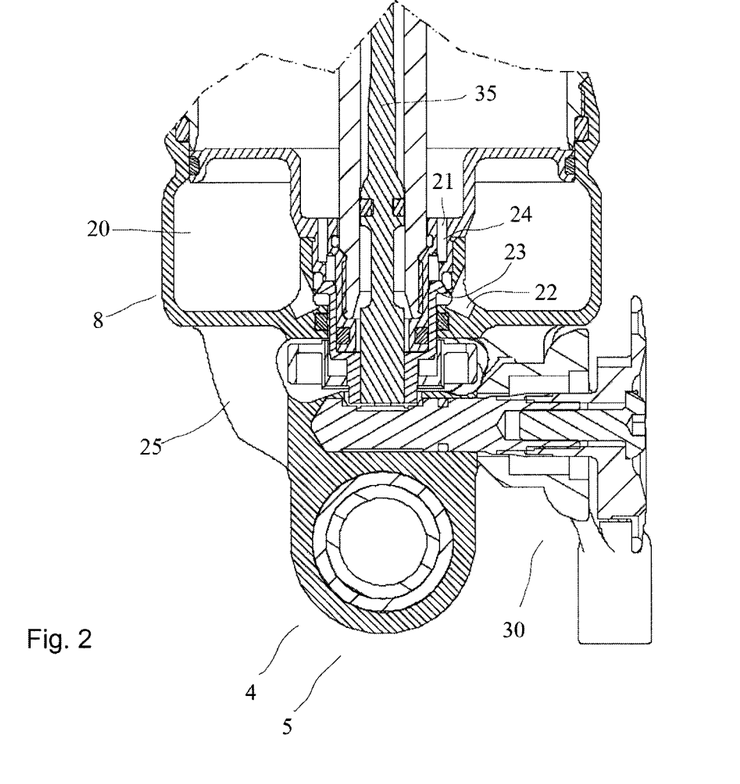
FIG. 2 is a sectional view of detail B of the spring system in FIG. 1.

FIG. 2 is an enlarged illustration of the second spring chamber 20 and the camshaft 31.

Figure 3:
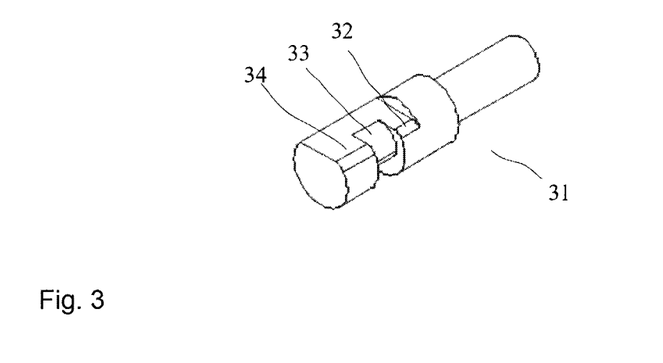
FIG. 3 is the camshaft of the spring system according to FIG. 1.

The camshaft 31 is illustrated separately also in FIG. 3. The camshaft shows the individual cams 32, 33 and 34 which cooperate with the axial rod 35 and the slider 23 to adjust the damping action and to adapt the progression of the spring characteristics.

All of the embodiments may provide instead of a rotatable camshaft, an axially displaceable adjustment element to displace the slider 23 or the axial rod 35 as required via cams or control projections.

Figure 4:
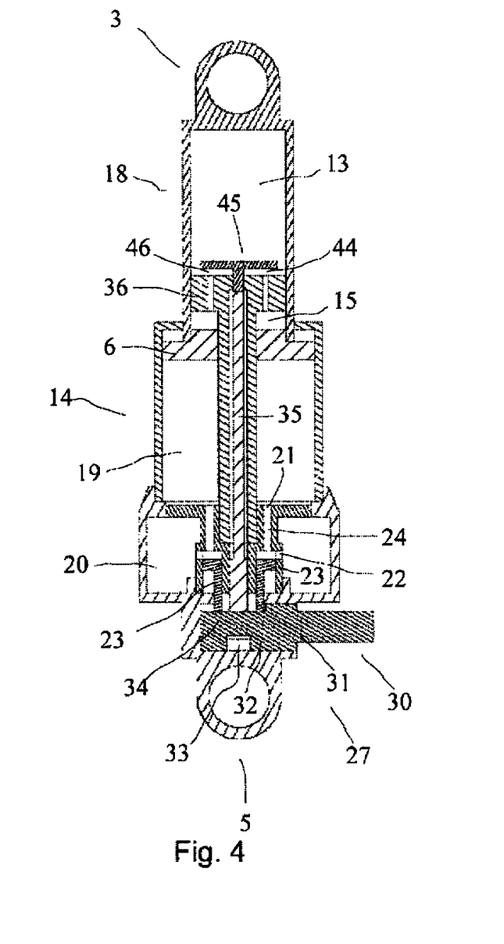
FIG. 4 is a schematic sectional view of another spring system in a first position.
Figure 5:
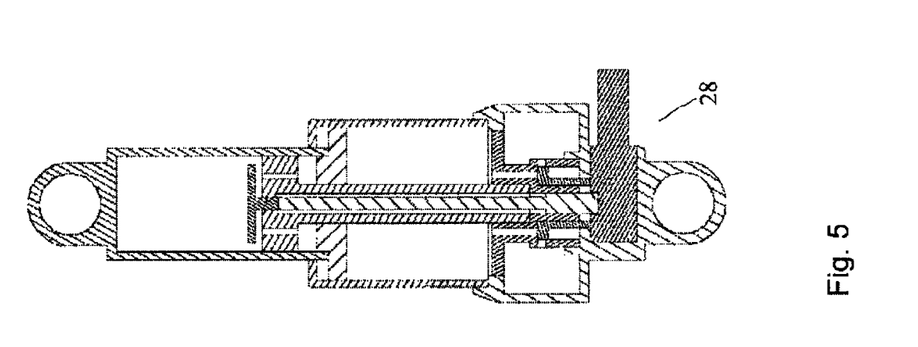
FIG. 5 is a schematic sectional view of the spring system according to FIG. 4 in a second position.
Figure 6:
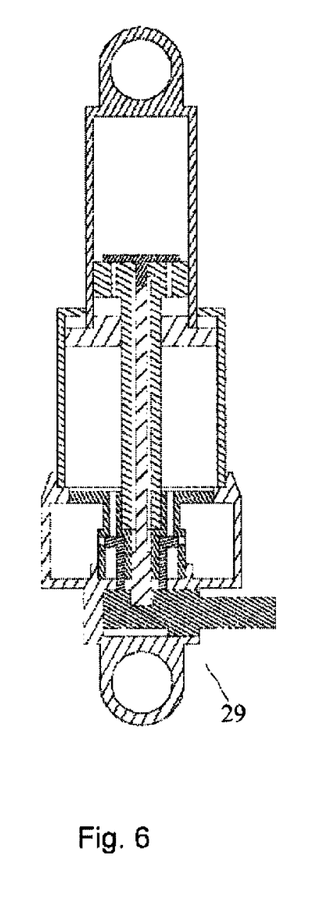
FIG. 6 is a schematic sectional view of the spring system according to FIG. 4 in a third position.

The FIGS. 4 to 6 schematically illustrate another embodiment. The FIGS. 4 to 6 illustrate the three different positions 27, 28 and 29 of the camshaft 31. To simplify reference, like or similar components are indicated with the same reference numerals as in the previous embodiment.

FIG. 4 illustrates another embodiment of a damper. Like or similarly acting components are indicated with the same reference numerals as in the previous embodiment.

The illustration in FIG. 4 shows the camshaft in the first position 27. The cams 32 and 34 are oriented such that the slider 23 unblocks the channel 24 and the spring chambers 19 and 20 are in communication with one another. The entire spring volume is now available. Furthermore the valve or check valve 45 is open in this position.

A rotation of the camshaft by a predefined angular amount such as 90° results in that the second position or setting illustrated in FIG. 5 is set. The cams 32 and 34 have moved the slider 23 in the direction toward the first end 3, thus blocking the apertures 22 in the partition 9 of the second spring chamber 20. The spring progression of the spring 14 is markedly increased and the suspension travel decreases due to the smaller spring volume available.

The position of the axial rod 35 is still maintained since the cam 33 is designed accordingly.

Another rotation of the camshaft by e.g. 90° sets the third position or third setting 29 where the slider 23 remains to be urged in the direction of the first end 2 through the cams 32 and 34 such that the apertures 21 and 22 remain blocked and the two spring chambers 19 and 20 remain separated. The spring progression remains high. Moreover the cam 33 has cooperated with the axial rod 35, resulting in displacement of the axial rod toward the second end 4 of the spring system 1. The check valve 45 has meanwhile blocked the apertures 44 and 46 of the damping means such that the damping action is influenced.

Other configurations provide the second spring chamber 20 to be further divided into two subchambers which can be activated separately so as to achieve a still more sensitive tuning of the gas spring progression. To this end, an outer mold could be used as illustrated in FIG. 1 wherein the spring chamber 20 is divided into two subchambers by a partition that is perpendicular relative to the plane of section in FIG. 1. A subchamber could be connected with the first spring chamber via aperture 21 and the other subchamber, with the first spring chamber via aperture 22. A suitable configuration of the cams 32 and 34 could then achieve a separate unblocking and blocking of the subchambers.

Figure 7:
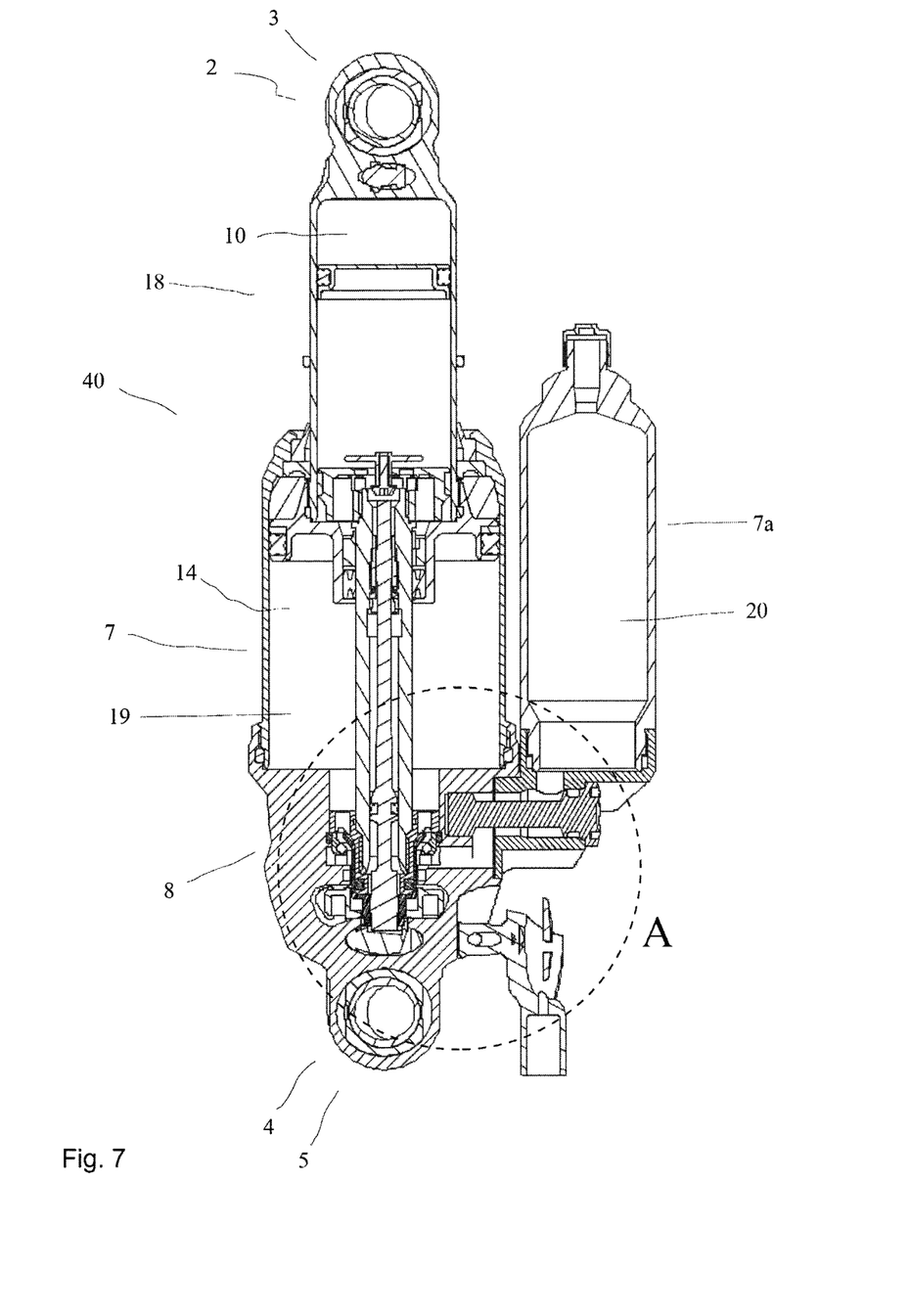
FIG. 7 is a schematic sectional view of another spring system.
Figure 8:
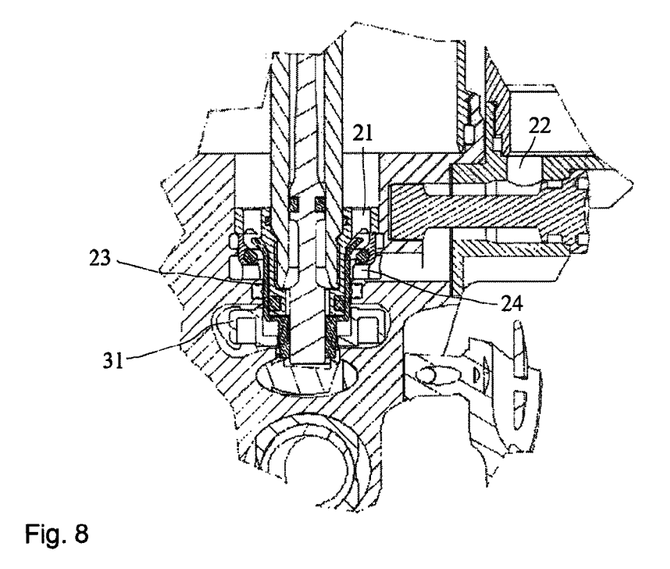
FIG. 8 is the enlarged detail A from the view in FIG. 7 with communicating spring chambers.
Figure 9:
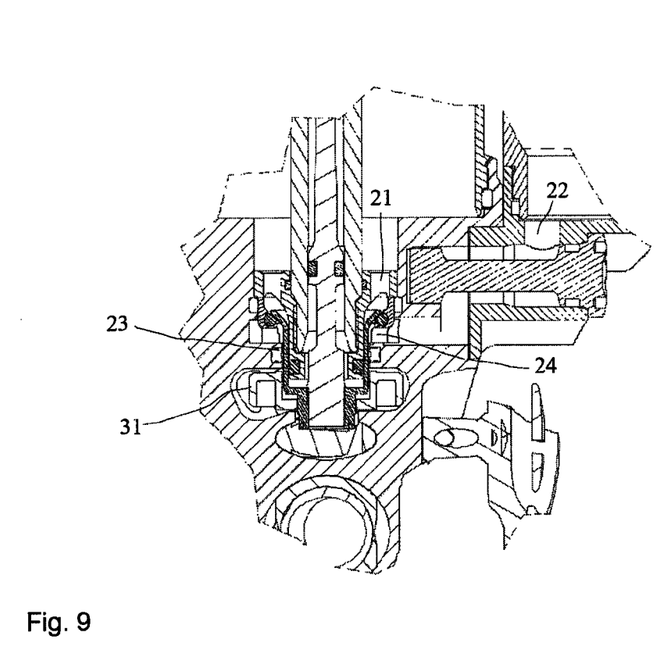
FIG. 9 is the enlarged detail A from the view in FIG. 7 with separated spring chambers.

The FIGS. 7, 8 and 9 illustrate yet another embodiment of a spring system. Again, like or similarly acting components are indicated at the same reference numerals as in the previous embodiments.

The spring system 1 in the FIGS. 7 to 9 also comprises several springs 10, 12, 14, 16, and a damping means 18. The spring system 1 includes a housing which comprises a damper housing 17, a housing element 7 and a housing segment 8. In compressing the damper housing 17 plunges into the housing element 7 configured approximately cylindrically in which the first spring chamber 19 of the gas spring 14 is arranged.

In this embodiment, the second spring chamber 20 is arranged externally in a separate housing 7a adjacent to the first spring chamber 19. Apertures 21 and 22 and channel 24 serve to connect the two spring chambers 19 and 20 of the gas spring 14 with one another. The slider 23 is arranged to be axially displaceable and urged in the direction toward the first end 2 of the spring system by means of the cam surfaces of the adjustment element 31 that is configured as a camshaft. Due to the gas pressure, the slider 23 is automatically returned to its initial position when the camshaft 31 is rotated in reverse.

When the camshaft 31 is in the position illustrated in FIG. 9, the two air chambers 19 and 20 of the gas spring 14 are separated from one another. When the camshaft 31 is rotated further, the cam surfaces are urged against the slider 23, displacing it into the position illustrated in FIG. 8 where the channel 24 is unblocked and the two apertures 21 and 22 and thus also the two spring chambers 19 and 20 communicate with one another. The spring characteristics become less progressive due to the larger total volume.

The function corresponds to the function of the previous embodiment.

Although the embodiment according to the FIGS. 7 to 9 provide an additional external cylinder comprising the second air chamber, the camshaft 31 arranged in the housing segment can be used to influence both the damping characteristics of the spring system and the spring characteristics of the gas spring 14 by means of unblocking or blocking the second spring chamber 20. The camshaft 31 is one common, single adjustment means in the damper housing 40 for effecting both adjustments.

The invention claimed is:

1. A spring system for bicycles comprising:
 a gas suspension spring including a suspension piston and adjustable progression;
 at least one negative spring; and
 a housing element for movably receiving the suspension piston of the gas suspension spring,
 a housing portion adjacent to and independent of said housing element, wherein a largest inner diameter of said housing portion is greater than a largest outer diameter of said housing element,
 wherein the gas suspension spring is configured as a positive spring and includes a spring volume including a first spring chamber and at least a second spring chamber separated from one another by a partitioning member; and
 the first spring chamber is arranged internal of the housing element and the second spring chamber extends internal of the housing portion,
 wherein a volume of said second spring chamber and a volume of said first spring chamber are independent of each other, and
 wherein said first spring chamber and said second spring chamber are axially adjacent to each other.

2. The spring system according to claim 1 wherein the housing element is designed to be an outer cylinder of the suspension piston.

3. The spring system according to claim 2 wherein the second spring chamber is arranged external of the outer cylinder.

4. The spring system according to claim 3 wherein the partition is arranged external of the outer cylinder.

5. The spring system according to claim 1 wherein the second spring chamber is substantially structured to be rotationally symmetric.

6. The spring system according to claim 5 wherein the second spring chamber is substantially configured to be annular.

7. The spring system according to claim 1 wherein the first spring chamber is substantially configured to be cylindrical.

8. The spring system according to claim 1 wherein an outer diameter of the second spring chamber is larger than an outer diameter of the first spring chamber.

9. The spring system according to claim 1 wherein the housing element is at least in part composed of a fibrous composite material.

10. The spring system according to claim 9 wherein the housing element is at least in part composed of a fibrous composite material with a thermoplastic matrix material.

11. The spring system according to claim 1 wherein at least one damping means is provided.

12. A spring system for bicycles comprising:
a gas suspension spring including a suspension piston and adjustable progression;
at least one negative spring;
a housing element for movably receiving the suspension piston of the gas suspension spring, said housing element having a longitudinal axis; and
a housing portion axially adjacent to said housing element on said longitudinal axis, said housing portion being independent of said housing element, wherein a largest inner diameter of said housing portion is greater than a largest outer diameter of said housing element,
wherein the gas suspension spring includes a spring volume including a first positive spring chamber and at least a second positive spring chamber separated from one another by a partitioning member, wherein said first and second positive spring chambers provide a spring force in a common direction relative to said housing element; and
the first spring chamber is arranged internal of the housing element and the second spring chamber extends internal of the housing portion,
wherein said first spring chamber and said second spring chamber are axially adjacent to each other.

* * * * *